(12) United States Patent
Monteiro et al.

(10) Patent No.: US 6,701,631 B1
(45) Date of Patent: Mar. 9, 2004

(54) CONVERTIBLE DIRECTIONAL AZIMUTH AND DIP MEASURING MODULAR COMPASS AND METHOD

(75) Inventors: Rogerio Noal Monteiro, Sudbury (CA); Carl Richard Laamanen, Sudbury (CA)

(73) Assignee: Inco Limited, Toronto (CA)

( * ) Notice: Subject to any disclaimer, the term of this patent is extended or adjusted under 35 U.S.C. 154(b) by 0 days.

(21) Appl. No.: 10/328,082

(22) Filed: Dec. 23, 2002

(51) Int. Cl.[7] .......................... G01C 17/04; G01C 1/00
(52) U.S. Cl. .................... 33/1 E; 33/273; 33/352; 33/355 D; 33/DIG. 21
(58) Field of Search ................ 33/1 E, 333, 334, 33/351, 352, 354, 355 R, 364, 355 D, 272, 273, 281, 282, 283, 285, 286, 290, 291, 319, DIG. 21

(56) References Cited

U.S. PATENT DOCUMENTS

| | | | | |
|---|---|---|---|---|
| 4,399,692 A | * | 8/1983 | Hulsing et al. ........... 73/152.54 |
| 5,046,259 A | * | 9/1991 | Tusting ........................ 33/272 |
| 5,531,031 A | | 7/1996 | Green ......................... 33/365 |
| 5,949,529 A | * | 9/1999 | Dunne et al. .............. 356/4.01 |
| 6,016,120 A | * | 1/2000 | McNabb et al. ........ 342/357.06 |
| 6,052,083 A | * | 4/2000 | Wilson .................. 342/357.17 |
| 6,240,649 B1 | * | 6/2001 | McElroy ...................... 33/286 |
| 6,243,660 B1 | | 6/2001 | Hsu et al. ................... 702/160 |

FOREIGN PATENT DOCUMENTS

DE  30355  8/1884

OTHER PUBLICATIONS

Breithaupt and Sohn specification sheet and photos (dates unknown)—http://www.breithaupt.de/compass.htm.
ASC Scientific specification sheet of the Freiberger Stratum Compass F-409 (date unknown)—http://shop.store.yahoo.com/ascientific/freibstratco.html.

* cited by examiner

Primary Examiner—Diego Gutierrez
Assistant Examiner—R. Alexander Smith
(74) Attorney, Agent, or Firm—Edward A. Steen

(57) ABSTRACT

A compass adapted to measure direction and dip values with or without the assistance of the earth's magnetic field. A laser pointer module and a magnetic needle module are interchangeably arranged in a body having an attached reference angle plate appropriately set to measure horizontal and vertical angles. The compass is especially useful in underground mines or other locations having magnetic anomalies where conventional magnetic compasses are rendered useless. Both embodiments are capable of taking readings when the compass is set in an upright or upside-down position.

19 Claims, 9 Drawing Sheets

CONVERTIBLE DIRECTIONAL AZIMUTH AND DIP MEASURING MODULAR COMPASS AND METHOD

TECHNICAL FIELD

The present invention relates to hand held compasses and dip angle readers in general and, more particularly to a portable unit capable of measuring the azimuth of geological features where the local magnetic field is distorted.

BACKGROUND OF THE INVENTION

Traditionally, common hand held compasses consist essentially of a circular body or case, a magnetized metallic pointer (needle) freely pivotally mounted with the body and a series of angular notations (degrees) circumscribing the pointer. The compass needle always aligns itself to the local expression of the earth's magnetic field north-south axis. On some models, a bubble level indicates when the compass case is positioned parallel to the horizontal plane.

Examples of commercially available units are the Breithampt and Sohn stratum compass number 3019 "Gekom™ (Kessel, Germany) and the Freiberger stratum compass "F409"™ (ASC Scientific, Calsbad, Calif.).

U.S. Pat. No. 6,243,660 to Hsu et al., depicts a hand held multiple-use compass having digital sensors and a laser beam for sighting.

U.S. Pat. No. 5,531,031 to Green discloses an electronic inclinometer having a rotatable laser. The laser establishes a precision reference plane for measurement.

German patentschrift 30355 to Von Paschwitz apparently shows a late nineteenth century portable magnetic compass with its body protected by a flip cover.

Normally, to acquire structural data, geologists use magnetic compasses. However, when working in areas where the magnetic field is distorted; that is, near magnetic rocks, in underground excavations such as mines and tunnels, or in metallic structures, the accuracy and precision of these measurements is highly compromised. In such areas, the use of a magnetic compass is foreclosed.

However, the geologist may be required to measure structural features in such environments in order to characterize the behavior of the rock. In such circumstances, the geologist must rely on making a visual estimation of a structure's azimuth. Alternatively, the geologist must use more time-consuming and expensive methods. Detailed structural work in underground environments has generally been avoided because of the lack of proper tools to accurately measure the orientation of lines and planes.

Accordingly, there is a need for a portable direction measuring apparatus that operates independently of the earth's magnetic field.

SUMMARY OF THE INVENTION

There is provided a flexible modular compass that uses simple geometric rules to determine the true dip-direction (azimuth), and the dip-angle of planes and lines observed on rocks. The compass includes a laser pointer rotatably mounted in a hinged case. It is a modular design that allows easy convertible interchange between the laser pointer module and an alternate magnetic-needle module, as required. The laser module is ideal for magnetically compromised locations or in low-light environments.

PREFERRED EMBODIMENT OF THE INVENTION

Figure 1:
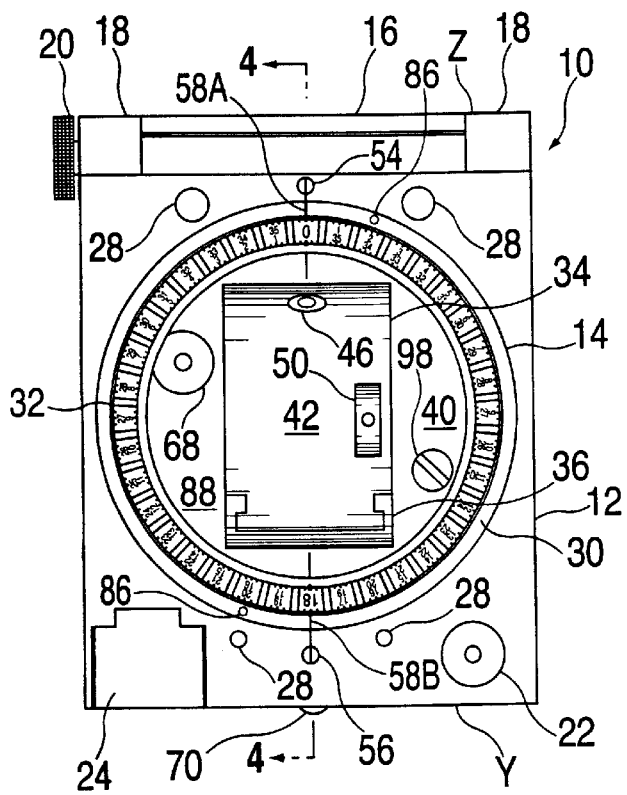
FIG. 1 is a plan view of an embodiment of the invention.
Figure 18:
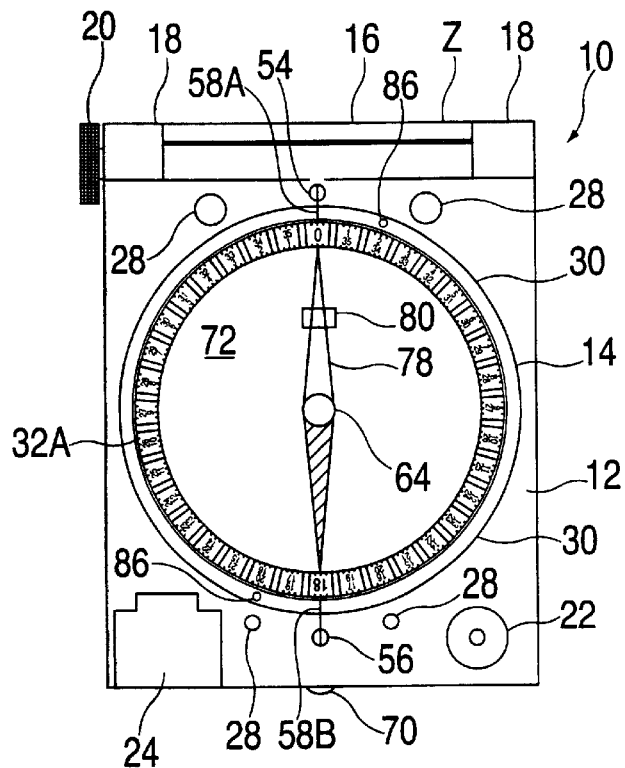
FIG. 18 is a plan view of an alternative embodiment of the invention.

Referring to FIGS. 1 and 18, there is shown a dual mode or convertible directional, azimuth and dip measuring apparatus 10 (broadly identified as the "compass").

FIG. 1 depicts the compass 10 in its laser mode. The laser mode may be used where external magnetization renders the use of a conventional magnetic compass problematic. FIG. 18 depicts the compass 10 in a conventional or magnetic pointer mode.

The terms: proximal, distal, upper, lower, top, bottom and the like are non-limiting arbitrary frames of reference and are used for orientation purposes only.

Figure 2:
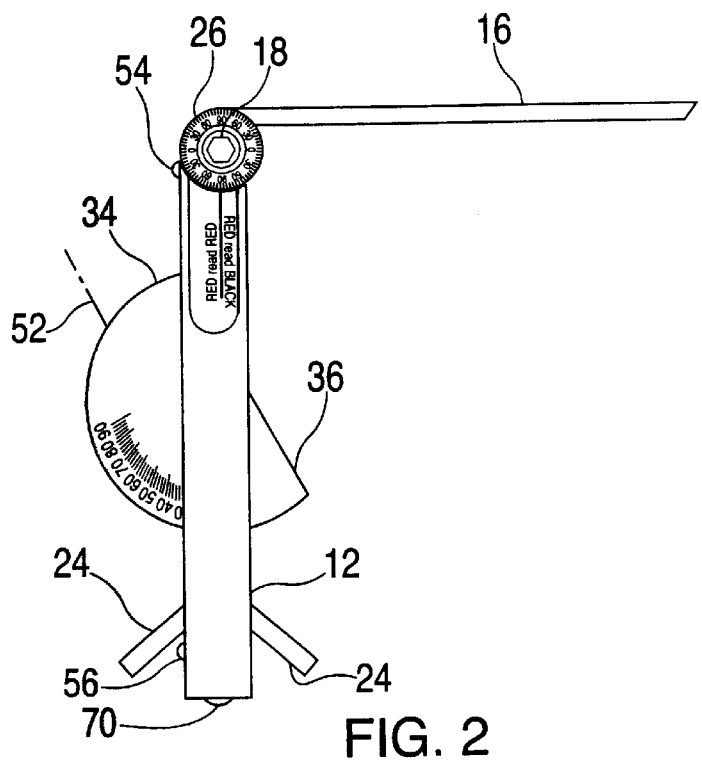
FIG. 2 is a side elevation of an embodiment of the invention.
Figure 3:
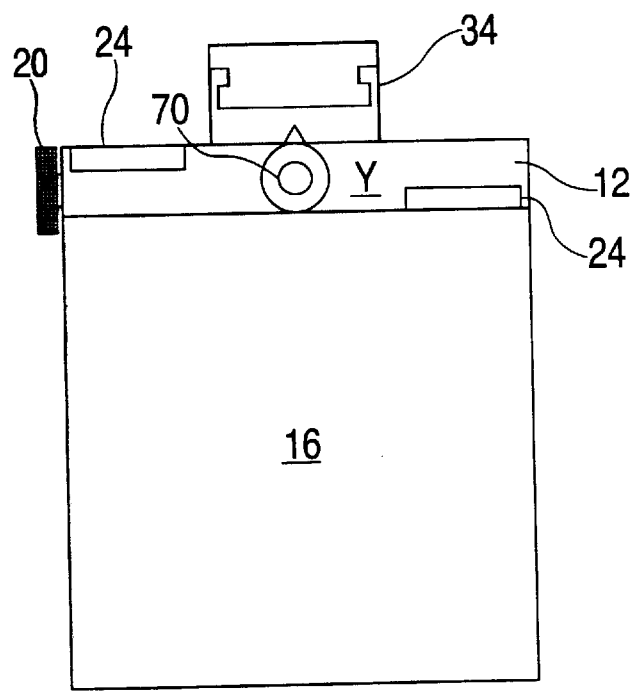
FIG. 3 is a front elevation of an embodiment of the invention.
Figure 19:
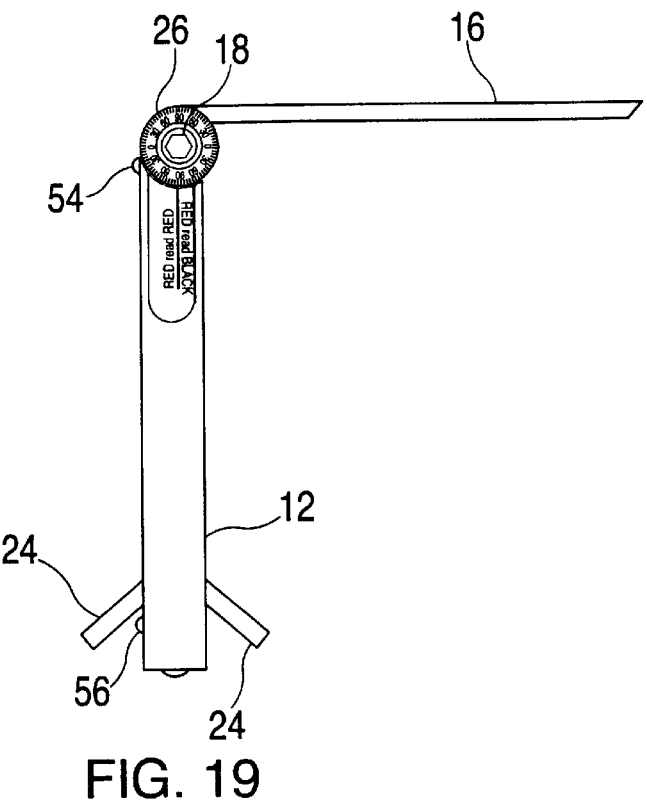
FIG. 19 is a side elevation of an alternative embodiment of the invention.
Figure 20:
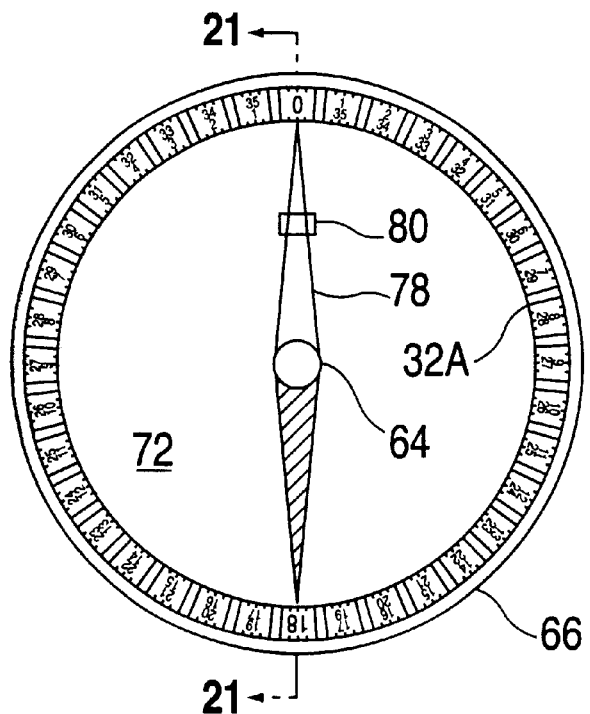
FIG. 20 is a plan view of an alternative embodiment of the invention.
Figure 21:
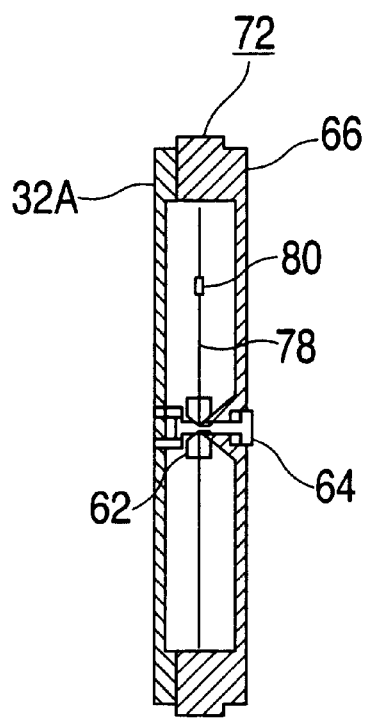
FIG. 21 is a cross sectional view taken along line 21—21 in FIG. 20.

Turning to FIGS. 1, 2, 18 and 19. The compass 10 consists of a main body 12 having a partially threaded central aperture 14. A hinged reference plate 16 is mounted to the proximal edge Z of the body 12 via hinges 18. A rotatable plate lock and thumb wheel 20 controls the position of the plate 16. As shown in FIGS. 2 and 19, dip angle markings on bezels 26 are mounted to each end of the hinges 18 so that the angle between the main body 12 and the plate 16 may be noted. Differentiated colors, such as red and black, are used to mark off the dip angle markings in a series of 0°–90° notations.

The main body 12 includes two bubble levels 22. They are mounted on each side of the main body 12 so as to be seen from both the top and bottom of the compass 10. FIGS. 1 and 18 show the top of the compass 10. Opposed pivoted mirrors 24 flip up (see FIGS. 2 and 19) to enable an observer to view the bubble levels 22 from either the top or bottom of the compass when the compass 10 is placed at or near eye level. A series of mounting holes 28 allow the compass 10 to be attached to a tripod or other device (not shown).

FIGS. 5–9 show the main body 12 in greater detail.

FIGS. 1–4, 10, 11, 12, 13 and 14, represent the compass 10 in its laser mode from various views and the various components that constitute the laser mode.

More particularly, a laser module 42 consisting of a laser pointer 34, a freely movable laser pointer mounting assembly 40, a double sided azimuth bezel ring 32 having degree markings on both sides and a threaded outer retainer ring 30 fits into the central aperture 14. The mounting assembly 40 is depicted as a two axis gimbal mount. However, alternative mounts that enable the laser pointer 34 to freely rotate in at least two dimensions/axis are acceptable.

The laser pointer 34 includes an arcuate housing 36, a low power laser diode 46, a battery power source 48 and a switch 50. The emerging laser beam is identified by numeral 52. In the embodiment shown, the laser diode 46 is a class 111A industrial grade ruby red laser model ER6 available from the "the laser guy.com", Seabrook, Tex.

Figure 4:
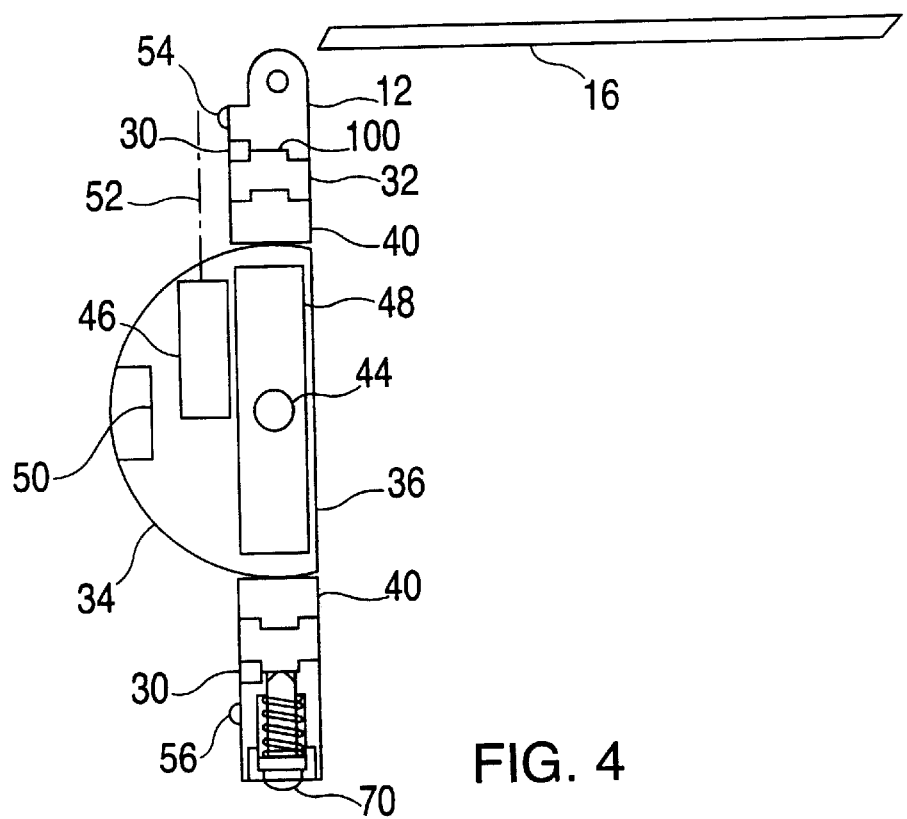
FIG. 4 is a cross sectional view taken along line 4—4 in FIG. 1.
Figure 5:
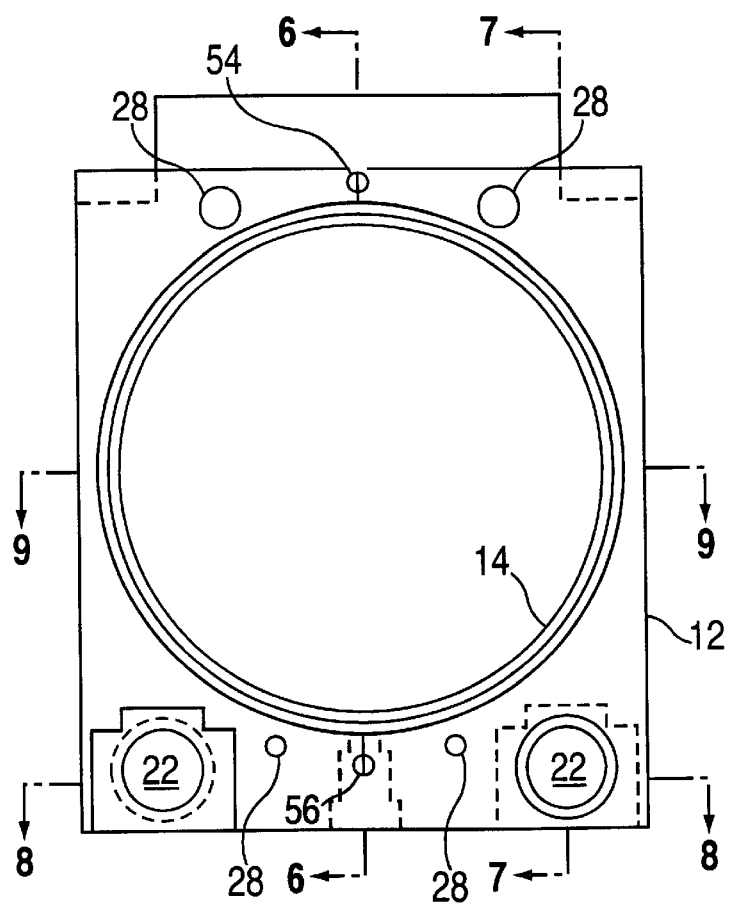
FIG. 5 is a plan view of an embodiment of the invention.
Figure 6:
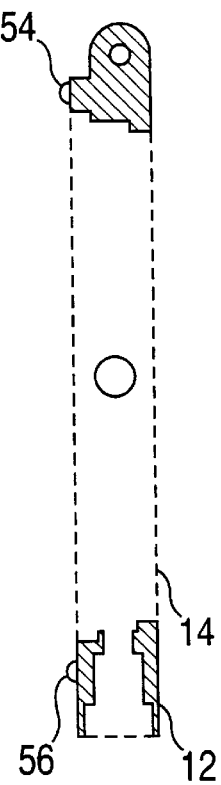
FIG. 6 is a cross sectional view taken along line 6—6 in FIG. 5.
Figure 8:
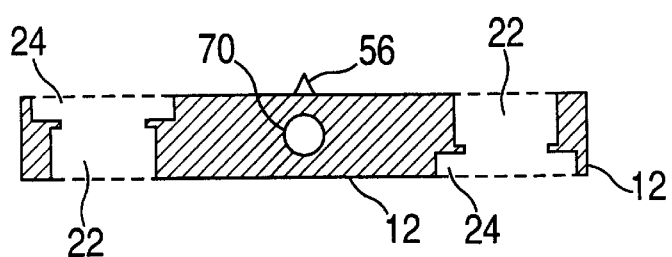
FIG. 8 is a cross sectional view taken along line 8—8 in FIG. 5.
Figure 13:
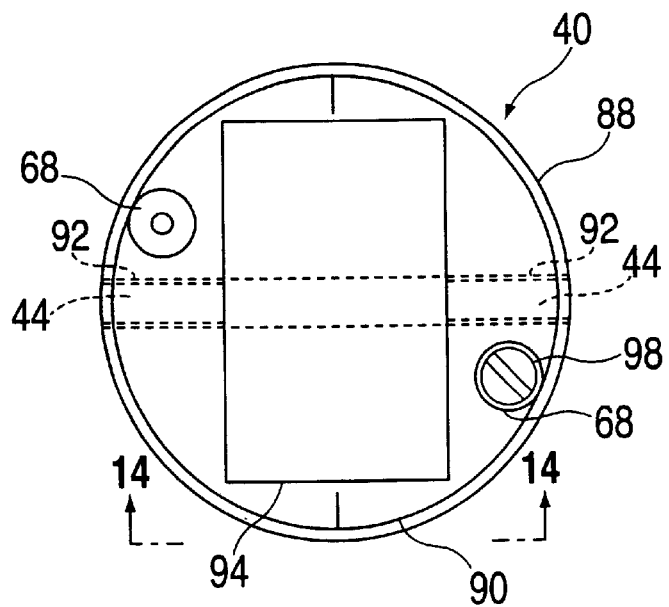
FIG. 13 is a plan view of an embodiment of the invention.
Figure 14:
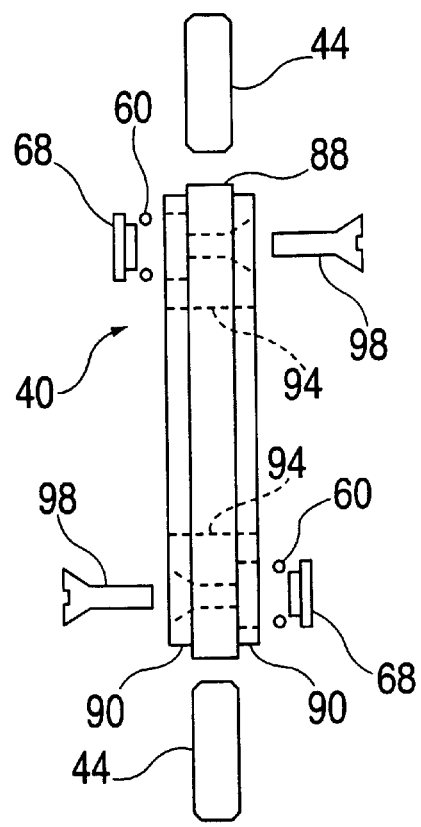
FIG. 14 is a partially exploded elevation taken along line 14—14 of FIG. 13.

Turning now to FIGS. 4, 13 and 14, the movable pointer assembly 40 is shown as a two-axis gimbals assembly. The assembly 40 is essentially a compound disk mount pivoted about pivot pins 44. The assembly 40 is a circular disk 88 having a central cut-out 94 circumscribed by opposed indented shoulders 90. The pivot pins 44 are inserted into slots 92 extending from the external periphery of the disk 88 to the central cutout 94. The laser pointer 34 is pivotally mounted within the central cut-out 94 of the assembly 40 via the pivot pins 44. The pivot pins 44 permit the laser assembly 40 to rotate 360° perpendicular to the body 12 within the assembly 40 to enable the inversion of the compass 10 for readings, not possible in the normal upright mode. Additionally, the laser pointer 34 can rotate through 360° in the plane parallel to the main body 12.

Figure 10:
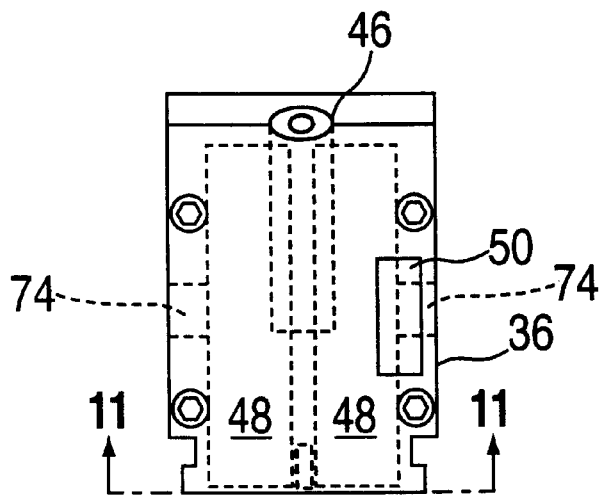
FIG. 10 is a plan view of an embodiment of the invention.
Figure 12:
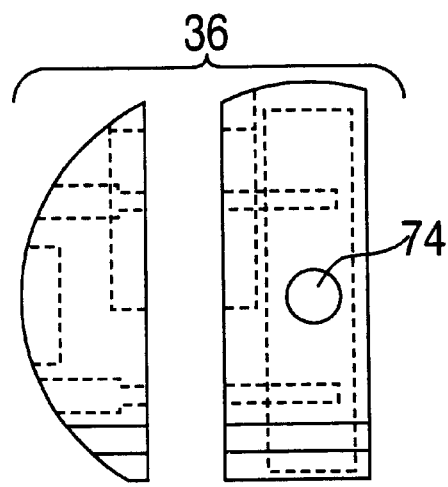
FIG. 12 is a split side elevation of an embodiment of the invention.
Figure 11:
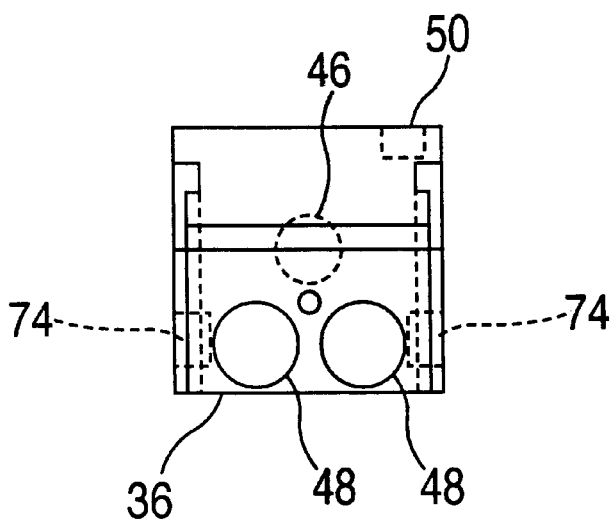
FIG. 11 is a front elevation taken along line 11—11 in FIG. 10.

FIGS. 10–12 depict the arcuate housing 36. The pivot pins 44 extend into cups 74. The arcuate housing 36 rotates around the pivot pins 44.

As seen in FIG. 14, internal frictional pads 68, made from rubber, polymer or similar materials, are attached to the disk 88 by fasteners 98 and rubber O-rings 60.

Figure 15:
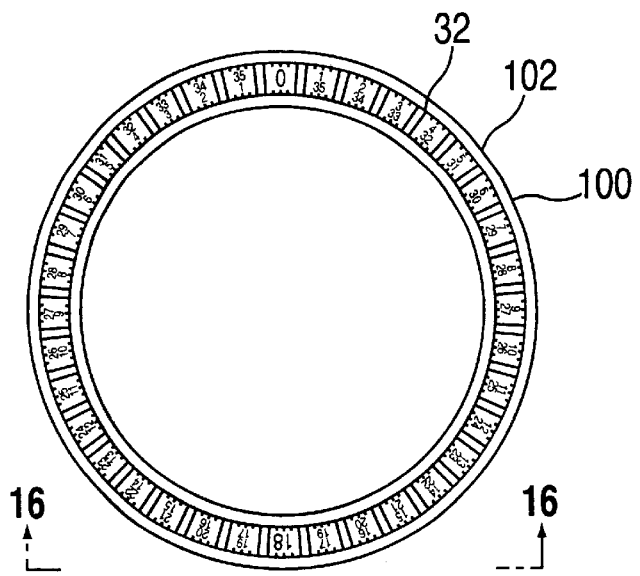
FIG. 15 is a plan view of an embodiment of the invention.
Figure 16:
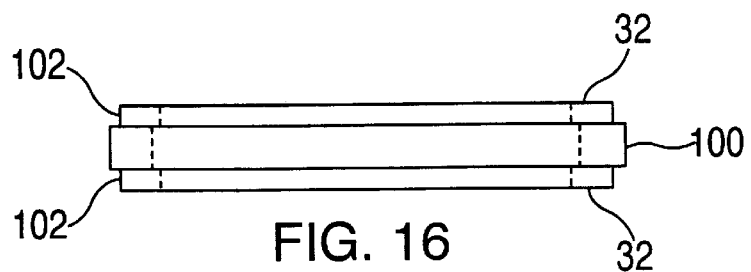
FIG. 16 is an elevation taken along line 16—16 of FIG. 15.
Figure 17:
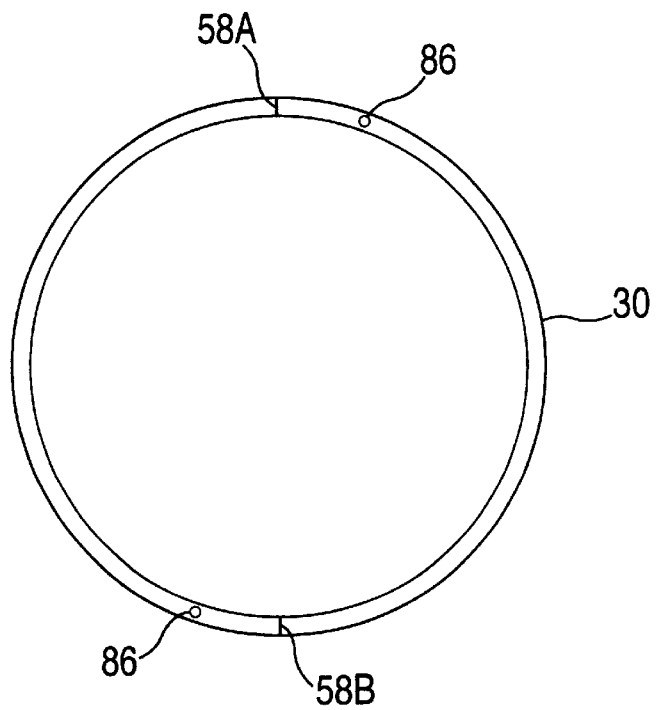
FIG. 17 is a plan view of an embodiment of the invention.

Turning now to FIGS. 15–17, a second disk 100, slightly larger in diameter than the disk 88, includes the opposed calibrated azimuth bezel ring 32. The disk 100 includes opposed shoulders 102. Only the upper azimuth bezel marked ring 32 is fully shown in most of the relevant figures.

Both sides of the marked azimuth bezel ring 32 allow for the reading of azimuth (angle of the laser pointer 34 in the horizontal plane) relative to the main body 12 of the compass 10. Two sets of numbers are disposed on the opposed upper and lower surfaces of the bezel ring 32. An outer set of number starts with "0" and proceeds in a clockwise manner to "359"(labeled every 10° degrees). An inner set of numbers starts with 360 (coincident with 0 of the outer set) and proceeds in a clockwise manner to 0 (also labeled every 10 degrees). Aiming pins 54 and 56 provide frames of reference on the main body 12.

The azimuth bezel ring 32 rotates independently of the pointer assembly 40 and the main body 12, making it adjustable to allow for direct reading once the angle to a known point is established, thus eliminating the need to calculate the angle each time when taking multiple readings in the same area. The ring 32 and the laser pointer 34 are independently rotatable.

Figure 9:
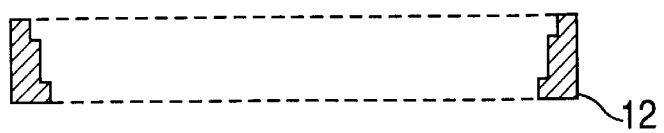
FIG. 9 is a cross sectional view taken along line 9—9 in FIG. 5.
Figure 7:
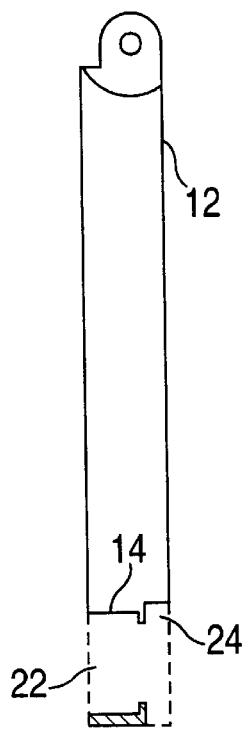
FIG. 7 is a cross sectional view taken along line 7—7 in FIG. 5.

The threaded outer retainer ring 30 holds the pointer assembly 40 and the bezel ring 32 in place to the main body 12. The shoulders 90 and 102 (FIGS. 13, 14 and 15, 16 respectively) hold the compass 10 together. FIG. 9 shows, in cross section, the respective perches (unnumbered) where the shoulders 90 and 102 connect to the body 12.

The retainer ring 30 includes two opposed holes 86 and two tick marks 58A and 58B 180° apart. See FIGS. 1, 17 and 18.

A pushpin lock 70 on distal edge Y both frees and stabilizes the laser pointer assembly 40 to permit rotation of the assembly 40 and rotation of the azimuth ring 32. It locks the components in position to aid in setting the desired declination. When the pushpin lock 70 is out and unlocked, the components (the azimuth bezel ring 32, and the gimbals assembly 40) may all freely rotate. When the pushpin lock 70 is in and locked, the components are essentially stabilized. To adjust the azimuth bezel ring 32, the push pin 70 is depressed and it will engage the bezel ring 32 at 0°, 90°, 180°, 270° thereby locking the bezel ring 32 to the body 12 of the compass 10. Then the laser pointer 34 is rotated until the desired angle (pseudo declination) is achieved by reading the angle off the side of the housing 36. See FIG. 2. Friction provided by the O-ring 60 interface between the bezel rings 32 and the assembly 40 will hold the ring 32 at its set angle once the pushpin 70 has been disengaged. These adjustments will be the same for either side of the compass 10.

The disk pads 68 generate sufficient friction against the azimuth bezel ring 32 to hold it in place after it is set.

The laser pointer assembly 40 is held in place in the aperture 14 in the main body 12 by a threaded outer retainer ring 30.

The laser module 42 is capable of measuring angles to +/–1° accuracy without relying on the Earth's magnetic field.

FIGS. 18–21 depict the magnetic compass module 72. The magnetic compass module 72 utilizes the main body (FIGS. 5–9) but essentially substitutes a magnetic needle 78 for the laser pointer 34.

The magnetic compass module 72 consists of a body 66, the magnetic needle 78, a magnetic needle weight 80, a needle pivot 62, a needle spring loaded push pin lock 64, a azimuth bezel ring 32A and a single threaded outer retaining ring 30 which holds the magnetic compass module 72 in the main body 12. In this instance the azimuth bezel ring 32A only has markings on one side.

The needle spring loaded push pin lock 64 or similar device allows the needle 78 to be locked in position.

It should be evident that a number of components are common to both the laser module 42 and the magnetic compass module 72 and act in similar fashions.

To facilitate interchange of the laser module 42 and the magnetic compass module 72 in both instances, the upper threaded retaining ring 30 is attached to the body of the laser module 42 and the magnetic compass module 72. The retaining ring 30 is unscrewed counter-clockwise until it is completely disengaged from the body 12. There are small holes 86 in the ring 30. A suitable tool (such as a scriber) is inserted into a hole 86 and the ring 30 is gently unscrewed until it is free of the body 12. The pointer assembly 40 can then be carefully removed from the compass 10 by tipping it over. Once the laser module 42 has been removed, the magnetic compass module 72 may be inserted in the reverse fashion. Care should be taken when resealing the retainer ring 30 as it can easily become cross-threaded. Then the ring 30 is tightened down firmly and then backed off until the hole 86 in the ring is opposite a predetermined reference mark (not shown) indicated on the body 12.

Once the magnetic compass module 72 is in place, the declination may be set by unlocking the pushpin 70 and rotating the azimuth bezel ring 32 accordingly to the desired declination and then locking it again. To take a reading with the compass 10, the spring-loaded pushpin lock 64 must be depressed to free the magnetic needle 78. It will freely rotate either in its normal upright attitude or if it is inverted. When the needle comes to rest, the pushpin lock 64 is redeployed by letting up on the pin. The lock will hold the magnetic needle 78 securely to allow the user to bring the compass 10 to a more comfortable position for reading without jeopardizing the integrity of the reading. This eliminates parallax that can alter readings in awkward positions.

The following discussion explains the use of the compass 10.

Readings of dip and dip-direction of both planar and linear features can be made with the compass 10, in both the laser and magnetic modes. In the magnetic mode, all angles are measured directly and dip-direction readings are taken relative to True North (assuming magnetic declination has been set on the compass—see Setting the Declination on the Magnetic Needle Module below). In the laser mode, however, while the dip angle is measured directly, the dip-direction measurement requires post-measurement calculations to yield an azimuth relative to True North.

Setting the Declination on the Magnetic Needle Module

As with most traditional compasses, the magnetic declination of the compass 10 must be set to compensate for the local magnetic declination (the angular difference at a given location between Magnetic North and True North). Unlock the pushpin 70 to free the azimuth bezel ring 32A, rotate it to the local magnetic declination, and then lock the pushpin 70. The needle weight 80, used to compensate for magnetic inclination, must be positioned on the magnetic needle 78 according to the geographic hemisphere. It should be on the south end of the magnetic needle for taking measurements in the northern hemisphere, and vice versa for the southern hemisphere.

Measuring Dip and Dip-Direction of Planar Surfaces in Both Laser and Magnetic Modes To read the dip angel of a surface, the flat surface of the reference plate 16 is placed parallel to the planar surface to be measured, ideally in direct contact with the surface. The main body 12 is then rotated until it is horizontal, as indicated by the bubble level(s) 22. The thumb wheel 20 can be used to lock the reference plate 16 in position, preserving the angle reading. The dip angle is measured on the dip angle bezel 26, using either the red or black (or other alternative colors) numerals. Note should be made of which color numerals are used.

If used, the laser diode 46 is then turned on with switch 50 and the laser pointer 34 is rotated in the horizontal plane, and in the vertical plane as required, to place the laser beam 52 on the selected target (point "A" in FIG. 22 and in the section Post-Measurement Calculations When Using the Laser Pointer Module below). To read the dip-direction, the angle measured on the azimuth bezel ring 32 is made using as a reference point the aiming pin 54 (red) or 56 (black) of the same color as the numerals used for the dip angle reading. The inner set of numbers should be used on the azimuth bezel ring 32. If the position of the compass 10 is a normal (right side up), and the reading on the dip angle bezel ring 32 was made using the red numerals, then the red aiming pin 54 is the proper reference point for the azimuth bezel ring 32 measurement. However, if the black numerals were used for the dip angle reading, the black aiming pin 56 is the proper reference point.

When the compass 10 is upside down to facilitate the measurement, the use of red numerals on the dip angle bezel ring 26 requires that the azimuth reading be made relative to the black aiming pin 56 reference point.

Measuring Dip and Dip-Direction of Linear Features in Both Laser and Magnetic Modes The procedure for measuring the dip angle and dip-direction of a linear feature is very similar to that employed for a planar surface, except that the side edge of the reference plate 16, instead of its flat surface, is held parallel to the linear feature to be measured. The main body 12 of the compass is then rotated to the horizontal along the axis of the linear feature using the bubble level 22 and the reference plate 16 position is locked using the thumb wheel 20. Reading the dip and azimuth angles follows the same procedures described above for planar surfaces.

Post-Measurement Calculations When Using the Laser Pointer Module

Dip-direction must be expressed relative to True North in order to properly relate it to other data. However, dip-direction azimuths measured with the laser pointer module 40 are relative to a local reference vector; they must be transformed to yield an azimuth that is relative to True North (dip-direction$_{TRUE}$).

Figure 22:
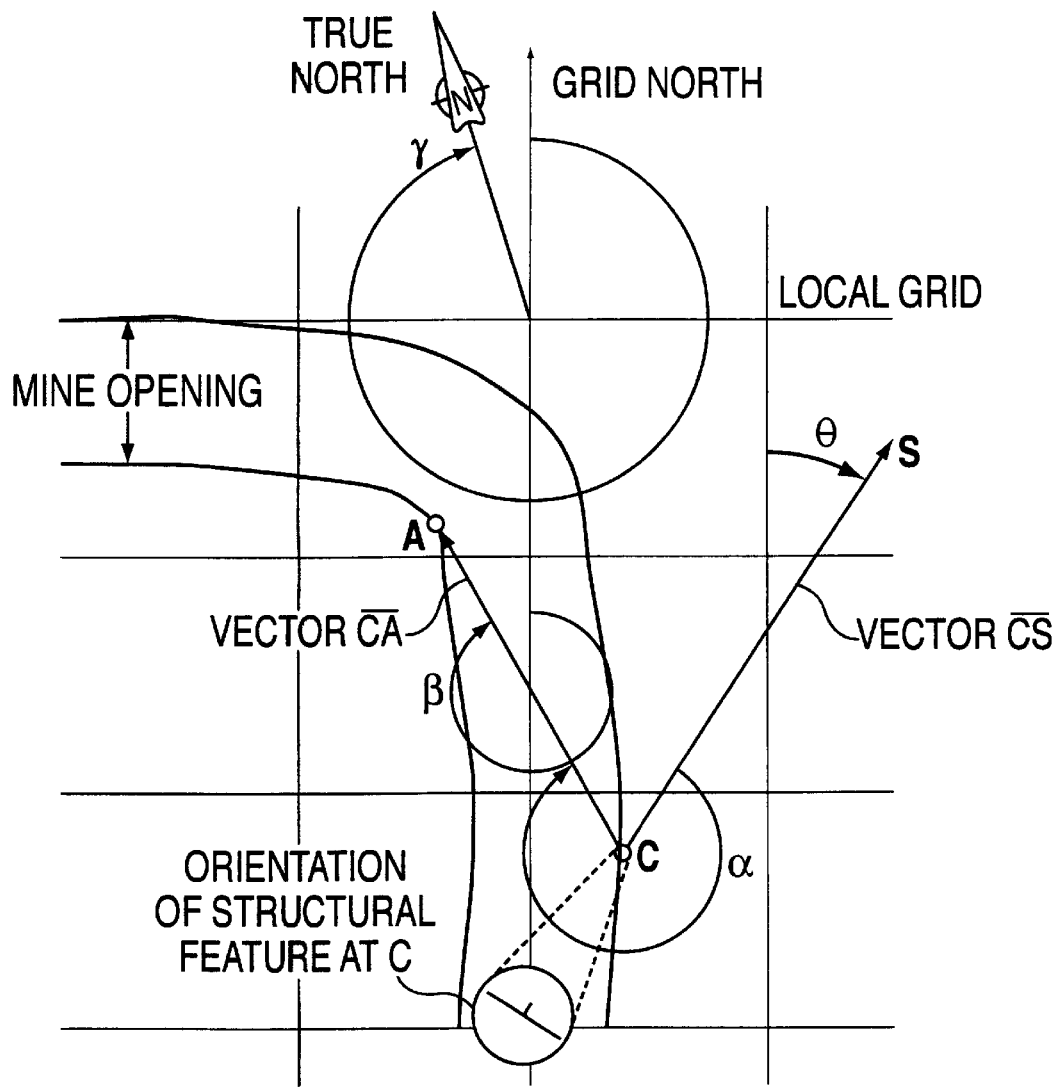
FIG. 22 is a plan view of a mine opening.

FIG. 22 shows a typical underground mine opening. A local co-ordinate system (local grid) is arbitrarily superimposed on the mine environment and locations are expressed as coordinate pairs East$_{Grid}$, North$_{Grid}$, in terms of the local grid. Directions are expressed relative to Grid North. The difference between the azimuth of Grid North and True North ($\gamma$) is known. 'A' is a surveyed point, the location of which is expressed in local grid coordinates as A$_{EAST}$, A$_{NORTH}$. 'C' is the site where a measurement is being made using the compass 10. The laser pointer 34, located at point 'C', is aimed at point 'A', defining the vector $\overline{CA}$, and the azimuth from the dip-direction of the structural feature to vector $\overline{CA}$ is measured as described above. Table 1 below defines the terms. All azimuths are measured clockwise.

TABLE 1

| | |
|---|---|
| TRUE NORTH | The direction to astronomic north |
| Magnetic North | The direction to the magnetic north pole |
| Grid North | The north direction on the local grid |
| $\gamma$ | The azimuth from Grid North to True North |
| S | Structural feature |
| $\alpha$ | The azimuth relative to a reference vector of the dip-direction of a structural feature's (read inner numerals on azimuth bezel ring) |
| Dip-direction$_{GRID}$ | The azimuth relative to Grid North of the dip-direction of a structural feature 'S' |
| $\theta$ | |
| Dip-direction$_{TRUE}$ | The azimuth relative to True North of the dip-direction of a structural feature 'S' |
| East$_{GRID}$, North$_{GRID}$ | The location of a point specified in terms of coordinates in a local coordinate system or grid |
| A | Aiming point, the target for the laser pointer |
| C | Point where a measurement is taken using the compass 10 |
| A$_{EAST}$, A$_{NORTH}$ | The location of point 'A' specified in local co-ordinates |
| Vector $\overline{CA}$ | The vector extending from point 'C' to 'A' |

TABLE 1-continued

| | |
|---|---|
| Vector $\overline{CS}$ | The vector extending from point 'C' parallel to the dip-direction of the measured structural feature 'S' |
| β | The azimuth from Vector$\overline{CA}$ to Grid North |
| Azimuth$_{GRID}$ | The azimuth relative to Grid North |
| Azimuth$_{TRUE}$ | The azimuth relative to True North |

If the Azimuth$_{GRID}$ of vector $\overline{CA}$ is known, the transformation of the measured azimuth (vector $\overline{CS}$) to an Azimuth$_{TRUE}$ is done in two steps:

1. Transform the measured azimuth α, (vector $\overline{CS}$), to be relative to Grid North:
   If $\alpha \leq \beta$, Then $\theta=\beta-\alpha$
   Else $\theta=360-(\alpha-\beta)$
2. Transform θ (dip-direction$_{GRID}$) to dip-direction$_{TRUE}$, relative to True North:
   If $(\theta-\gamma)=0$,
   Then dip-direction$_{TRUE}=360+(\theta-\gamma)$
   Else dip-direction$_{TRUE}=(\theta-\gamma)$ To illustrate using information from FIG. 22:
Step 1
  α=Azimuth of vector $\overline{CS}$=298,
  β=331
  α<β, therefore θ=331−298=33
Step 2
  θ=33 (from Step 1) and γ=343
  (θ−γ)<0, therefore (θ−γ)=360+(33−343)=50

The azimuth of the dip-direction is 50, relative to True North.

If the azimuth of vector $\overline{CA}$ is not known, an additional step is required to calculate this azimuth using the location of point 'C', or a reasonable estimate must be made, in terms of the local grid. Reasonable estimates (±1 meters) of the co-ordinates of point 'C' are acceptable. That is, the error introduced into the measurement is within the precision of the compass (±1°), if the length of vector $\overline{CA}$ is large (50 meters or more).

The Azimuth$_{GRID}$ of vector $\overline{CA}$ is calculated as follows, depending upon the quadrant that contains the angle. Subtract the $A_{EAST}$ and $A_{NORTH}$ coordinate pair from the $C_{EAST}$ and $C_{NORTH}$ coordinate pair to yield the co-ordinate pair E, N. If the resulting co-ordinate pair angle is in the northeast (NE) quadrant, then the Azimuth$_{GRID}$ of vector $\overline{CA}$ is (atan(E/N)). Formulae for the other quadrants are as follows:

SE Quadrant: Azimuth$_{GRID}$ of vector $\overline{CA}$=(180−atan(E/N))

SW Quadrant: Azimuth$_{GRID}$ of vector $\overline{CA}$=(180+atan(E/N))

NW Quadrant: Azimuth$_{GRID}$ of vector $\overline{CA}$=(360−atan(E/N))

Once the value for Azimuth$_{GRID}$ of vector $\overline{CA}$ is calculated it can be used before Step 1 described above.

The present method of measurement may, of course, be utilized with a laser only compass having features corresponding to the laser mode compass 10.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A modular compass adapted for magnetic and non-magnetic measurements, the compass comprising a body, the body having an upper surface, a lower surface and an aperture extending through the body, an angle reference plate hinged to the body, a dip angle bezel communicating with the angle reference plate, an interchangeable laser module and magnetic compass module removably affixed to the aperture, a lock communicating with the aperture, an outer retaining ring disposed about the aperture, a rotatable calibrated azimuth ring disposed between the outer retaining ring and either the laser module or the magnetic compass module, the laser module and the magnetic compass module adapted to rotate within the aperture, at least one bubble level disposed in the body, and at least one pivotable mirror adjacent to the bubble level.

2. The modular compass according to claim 1 wherein the aperture is threaded so as to threadably engage the outer retaining ring.

3. The modular compass according to claim 1 wherein the laser module includes a movable pointer assembly, a laser disposed in the movable pointer assembly, a power source connected to the laser, and a power source switch.

4. The modular compass according to claim 3 wherein the laser module assembly includes a rotatable mount adapted to rotate in at least two axis, the laser pivotally mounted within the rotatable mount, the azimuth bezel ring circumscribingly engaging the laser module, and the lock adapted to engage the laser module.

5. The modular compass according to claim 4 wherein the mount is a gimbal mount.

6. The modular compass according to claim 5 wherein the mount includes a disk having a central cut out and an exterior circumference, a pair of opposed pivot pins extending between the central cut out and the exterior circumference of the disk, the disk including a pair of opposed cliffs and at least one friction pad.

7. The modular compass according to claim 6 wherein a housing is rotatably disposed within the disk, the housing including the laser, power source and switch, and the pivot pins extending into the housing.

8. The modular compass according to claim 1 wherein the magnetic compass module includes a second body, a rotatable needle within the second body, a needle weight and a needle lock.

9. The modular compass according to claim 8 wherein the threaded outer retainer ring circumscribes the second body.

10. The modular compass according to claim 1 wherein the threaded outer retainer ring includes at least one hole.

11. The modular compass according to claim 1 wherein one bubble level is disposed in and viewable from the upper surface of the body and a second bubble level is disposed in and viewable from the lower surface of the body, and the first and second bubble levels covered by a movable mirror.

12. The modular compass according to claim 1 wherein the dip angle bezel includes angular notations in alternative colors.

13. The modular compass according to claim 1 wherein the azimuth ring is double sided.

14. A dual method for taking dip and dip-direction readings of a surface in a location by a convertible laser and magnetic mode compass, the method comprising:
   a) employing a modular compass adapted for magnetic and non-magnetic measurements, the compass comprising a body, the body having an upper surface, a lower surface and an aperture extending through the body, an angle reference plate hinged to the body, a dip angle bezel communicating with the angle reference plate, an interchangeable laser module and magnetic compass module removably affixed to the aperture, a lock communicating with the aperture, an outer retaining ring disposed about the aperture, a rotatable calibrated azimuth ring disposed between the outer retaining ring and either the laser module or the magnetic compass module, the laser module and the magnetic compass module adapted to rotate within the aperture, at least one bubble level disposed in the body, and at least one pivotable mirror adjacent to the bubble level;

b) determining whether the location is magnetically compromised and, if not magnetically compromised, setting the local magnetic declination of the compass;

c) reading the dip angle of the surface by orienting the compass relative to the surface and noting the dip angle bezel reading; and d) if the location is magnetically compromised, utilizing the laser module, to determine the dip-direction as a function of the dip angle as noted by the dip angle bezel above.

15. The dual method according to claim 14 including expressing the dip-direction relative to True North.

16. The method according to claim 14 including superimposing a local co-ordinate grid system over the location, establishing coordinate pairs $East_{Grid}/North_{Grid}$ relative to a Grid North, with the difference between an $Azimuth_{Grid}$ between the Grid North and True North ($\gamma$) known, establishing a surveyed point A on the local co-ordinate grid system as $A_{east}/A_{north}$, reading the compass at site C and aiming the compass at the point A from the site C so as to define a vector $\overline{CA}$ and noting the above $Azimuth_{Grid}$, and transforming the $Azimuth_{Grid}$ of vector $\overline{CA}$ to a Azimuth True of a vector $\overline{CS}$ from the site C to a measured structural feature S of the location by noting a measured azimuth ($\alpha$) of vector $\overline{CS}$ and noting a measured azimuth from the vector $\overline{CA}$ to the Grid North, and carrying out the following transformation to be relative to the Grid North:

A) If $\alpha \leq \beta$ Then: $\theta = \beta - \alpha$
    Else: $\theta = 360 - (\alpha - \beta)$; and Transferring $\theta$ to dip-direction$_{True}$ relative to True North as below, B) If $(\theta - \gamma) \leq 0$
    Then: dip-direction$_{True} = 360 + (\theta - \gamma)$
    Else: dip-direction$_{True} = (\theta - \gamma)$.

17. The method according to claim 16 including calculating the $Azimuth_{Grid}$ of the vector CA by subtracting the $A_{east}/A_{north}$ coordinate pair from side points $C_{east}$ and $C_{north}$ to yield the coordinate pair E/N, if E/N is in the northeast quadrant of the local coordinate grid system, then the $Azimuth_{Grid}$ of vector CA=atan(E/N), if E/N is in the southeast quadrant, then the $Azimutt_{Grid}$ of vector CA=(180−atan(E/N)), if E/N is in the southwest quadrant of the local coordinate grid, then the $Azimuth_{Grid}$ of vector CA=(180+atan(E/N)), and if E/N is in the northwest quadrant of the local coordinate grid, then the $Azimuth_{Grid}$ of vector CA=(360−atan(E/N)).

18. A method for taking dip and dip-direction readings of a surface in a location with a laser pointer compass, the method comprising determining the dip-direction as a function of the dip angle, expressing the dip-direction relative to True North, superimposing a local co-ordinate grid system over the location, establishing coordinate pairs $East_{Grid}/North_{Grid}$ relative to a Grid North, with the difference between an $Azimuth_{Grid}$ between the Grid North and True North ($\gamma$) known, establishing a surveyed point A on the local co-ordinate grid system as $A_{east}/A_{north}$, reading the compass at site C and aiming the compass at the point A from the site C so as to define a vector $\overline{CA}$ and noting the above $Azimuth_{Grid}$, and transforming the $Azimuth_{Grid}$ of vector $\overline{CA}$ to a Azimuth True of a vector $\overline{CS}$ from the site C to a measured structural feature S of the location by noting a measured azimuth ($\alpha$) of vector $\overline{CS}$ and noting a measured azimuth from the vector $\overline{CA}$ to the Grid North, and carrying out the following transformation to be relative to the Grid North:

A) If $\alpha \leq \beta$ Then: $\theta = \beta - \alpha$
    Else: $\theta = 360 - (\alpha - \beta)$; and Transferring $\theta$ to dip-direction$_{True}$ relative to True North as below, B) If $(\theta - \gamma) \leq 0$
    Then: dip-direction$_{True} = 360 + (\theta - \gamma)$
    Else: dip-direction$_{True} = (\theta - \gamma)$.

19. The method according to claim 18 including calculating the $Azimuth_{Grid}$ the vector CA by subtracting the $A_{east}/A_{north}$ coordinate pair from side points $C_{east}$ and $C_{north}$ to yield the co-ordinate pair E/N, if E/N is in the northeast quadrant of the local coordinate grid system, then the $Azimuth_{Grid}$ of vector CA=atan(E/N), if E/N is in the southeast quadrant, then the $Azimuth_{Grid}$ of vector CA=(180−atan(E/N)), if E/N is in the southwest quadrant of the local coordinate grid, then the $Azimuth_{Grid}$ of vector CA=(180+atan(E/N)), and if E/N is in the northwest quadrant of the local coordinate grid, then the $Azimuth_{Grid}$ of vector CA=(360−atan(E/N)).

* * * * *